Aug. 17, 1965　　　　　L. PERAS　　　　　3,200,794
ROTARY ENGINES
Filed Nov. 16, 1961　　　　　　　　　　4 Sheets-Sheet 1
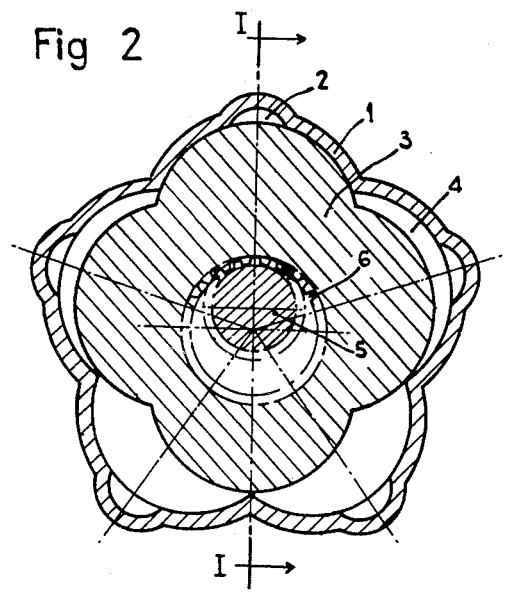
Fig 2
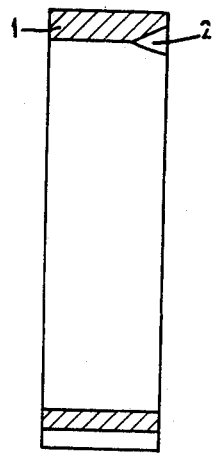
Fig. 1
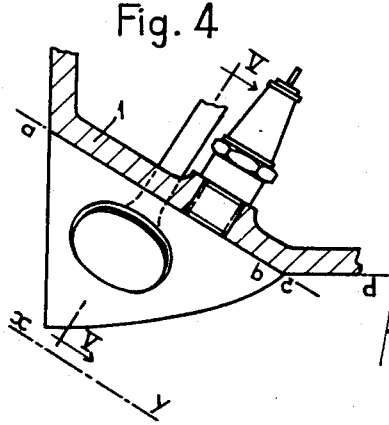
Fig. 4
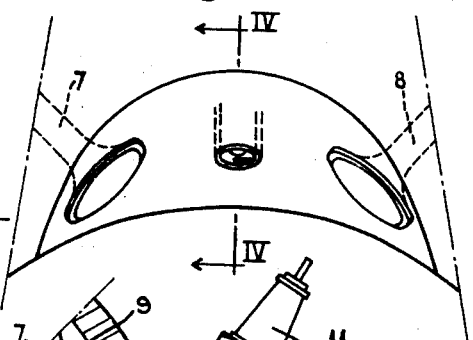
Fig. 3
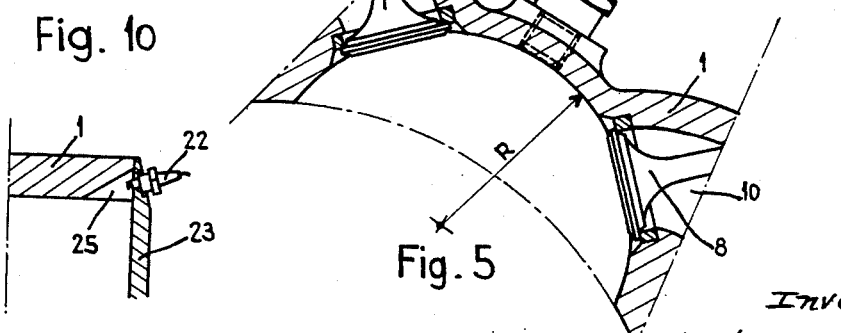
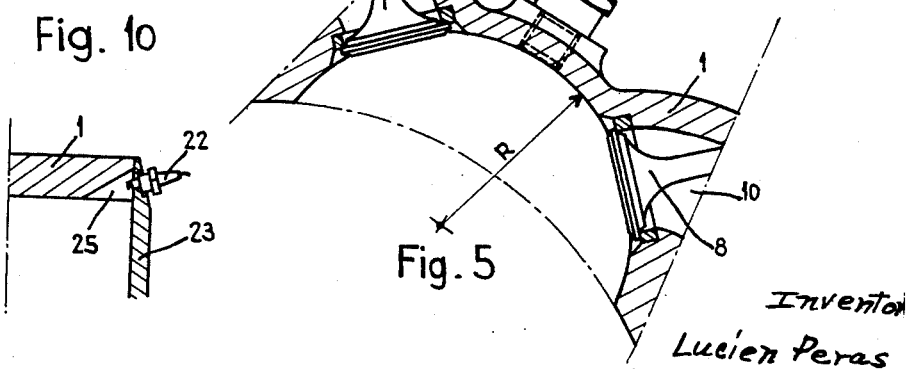
Fig. 10
Fig. 5
Inventor
Lucien Peras
By Stevens Davis Miller & Mosher
Attorneys Aug. 17, 1965 L. PERAS 3,200,794
ROTARY ENGINES
Filed Nov. 16, 1961 4 Sheets-Sheet 2

Inventor
Lucien Peras
By Stevens, Davis, Miller & Mosher
Attorneys

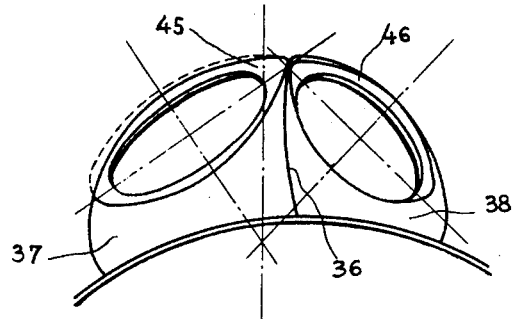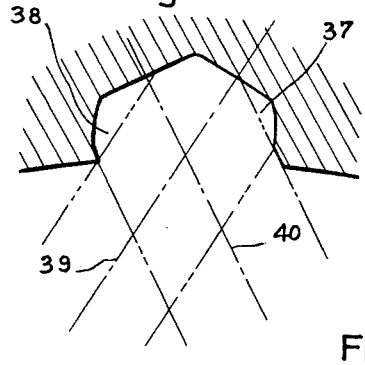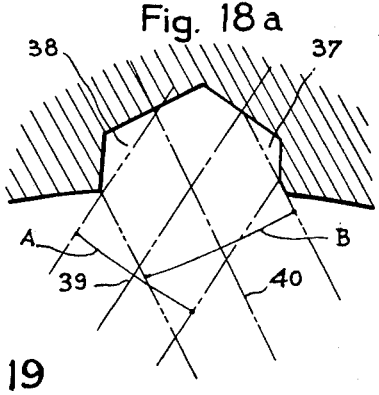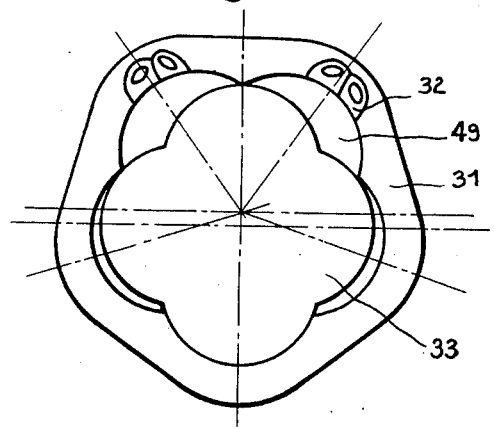

United States Patent Office 3,200,794
Patented Aug. 17, 1965

3,200,794
ROTARY ENGINES
Lucien Peras, Billancourt, France, assignor to Regie
Nationale des Usines Renault, Billancourt, France
Filed Nov. 16, 1961, Ser. No. 152,812
Claims priority, application France, Nov. 21, 1960,
844,570, Patent 1,281,979; Dec. 27, 1960, 848,115,
Patent 78,955
7 Claims. (Cl. 123—8)

The invention relates to combustion chambers for rotary engines which comprise a stator with (N+1) lobes and a stator with N lobes, the latter pivoting on an eccentric rigidly fixed to the crankshaft.

This type of engine has (N+1) combustion chambers of variable volume, de-limited by the inner and outer contours of the stator and the rotor; the said contours may be of epicycloidal or hypocycloidal form.

In order to obtain a compression ratio compatible with satisfactory working of the engine and in order to create the best conditions for the firing of the explosive mixture, it is an advantage to form in the stator, cavities which form combustion chambers, one associated with each working chamber.

The combustion chambers are usually provided with the admission valves and the exhaust valves, together with the sparking plugs.

The present invention relates to improvements in the form and in the method of producing these combustion chambers. It consists in forming the combustion chamber in the thickness of the ring forming the central part of the stator, and in giving it the shape of a wedge, the wide portion of which appears on one of the sides or the section of the ring, the chamber becoming thinner towards the centre. Under these conditions, the chamber can be fully machined by simple operations on a machine tool. The wedge shapes thus obtained by placing the chambers on one side of the stator permit the construction of compact and readily accessible combustion chambers which are best adapted to the admission and exhaust valves and also to the sparking plug, when so required. In an alternative form, the sparking plug can be placed in an end cheek of the stator so as to provide for the housing of valves of large size.

In accordance with one form which lends itself well to the construction of an engine with a high compression ratio, the chamber is particularly compact and is adapted to house two valves of large size as compared with the volume of the chamber, the latter being formed by two machining operations which take the form of two truncated cones, the axes of which are convergent and the intersection being located substantially on the interior contour of the stator.

An advantage of this form of chamber is that it avoids wire-drawing of the gases between the valve and the walls, due to the fact that the latter are cleared following a surface of revolution about the axis of each valve. A further advantage of the design of this chamber is that it lends itself particularly well to the prevention of detonation as a result of the interpenetration of the two truncated cones which form concave and convex profiles.

The invention will now be described with reference to the accompanying drawings, in which:

FIG. 1 is a longitudinal cross-section of a stator ring of a rotary engine having a combustion chamber hollowed out in the form of a wedge;

FIG. 2 is a transverse section of the stator and the rotor perpendicular to the longitudinal axis, showing the position of the combustion chambers;

FIGS. 3, 4 and 5 are views of a machinable combustion chamber, which is in the form of a cylinder inclined to the longitudinal axis of the casing;

FIG. 10 is a combustion chamber with the sparking plug housed in one of the end-plates;

FIG. 17 is a view in the direction of the arrow XVII of FIG. 15, the end-plate being removed;

FIGS. 18 and 18a are two alternative forms of the section of the chamber;

FIG. 19 is a side view of the stator, in which the combustion chambers are formed.

According to FIG. 1, there can be seen a longitudinal section of the stator ring 1 and at 2 the hollowed portion forming the combustion chamber. It can be seen that this hollow portion is located on the side of the ring, and that the penetration is greatest on the lateral face and diminishes progressively towards the interior of the stator until it becomes zero.

This arrangement constitutes a chamber in the form of a wedge, the shapes of which are geometric and are easily machinable.

FIG. 2 is a transverse section of a rotary engine showing the stator at 1, the rotor at 3 and a working chamber at 4 and a combustion chamber at 2.

At 5 and 6 are shown the driving gears of the rotor, of which one 5 is displaced by a value equal to the radius E of the eccentric of the crankshaft.

The combustion chambers 2 are located at the top portion of the working chambers 4, as shown in FIG. 2.

FIG. 3 is an exterior front view of a machinable combustion chamber and FIG. 4 is a cross-section along the line IV—IV of FIG. 3, FIG. 5 giving a cross-section taken along the line V—V of FIG. 4.

This chamber is formed geometrically by a penetration on the section of the casing, following a cylinder of radius R, the axis $x$–$y$ of which is oblique with respect to the axis of the engine. The generator lines such as $a$, $b$, of the chamber are rectilinear and parallel to the axis $x$–$y$.

The intersection of the cylinder with the section of the ring is an ellipse as shown in FIG. 3, which provides the surface of greatest penetration. This penetration diminishes progressively until it reaches zero when the upper generator line $ab$ meets the generator line $cd$ placed on the axis of symmetry of an epicycloid of the stator.

In the cross-section shown in FIG. 5, which has been made along the plane normal to the axis $x$–$y$ of the cylinder, the profile of the chamber is a cylinder of radius R.

There have been shown at 7 and 8 the admission and exhaust values, at 9 and 10 the corresponding conduits and at 11 the sparking plug.

Figure 6:
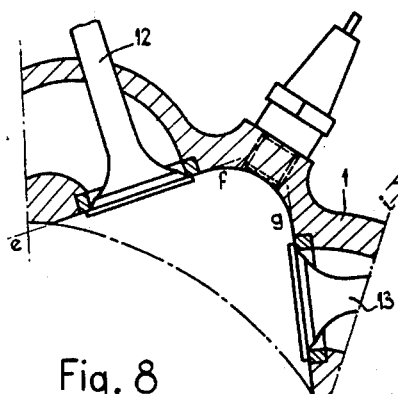
FIGS. 6, 7 and 8 are views of other forms of machinable combustion chambers.

FIG. 6 shows a further form of embodiment in which the cross-section of a combustion chamber made at right angles to the axis of penetration is constituted by two convergent straight lines e–f and g–h, connected together by a portion of the circumference. The admission valve 12 and the exhaust valve 13 are substantially perpendicular to each of the straight lines, and the sparking plug 14 is located at the top of the portion of circumference.

Figure 7:
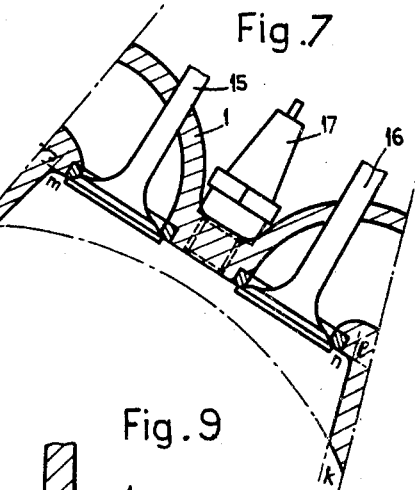

A further form of embodiment is shown in FIG. 7, which is a cross-section of a combustion chamber along a plane normal to the oblique angle of penetration. The general shape is that of a trapezium formed by two concurrent straight lines i–j and k–l, connected together by a further straight line m–n perpendicular to the axis of symmetry with connections along the small radii. The valves 15 and 16 are parallel and the sparking plug 17 is in the centre of the chamber.

Figure 8:
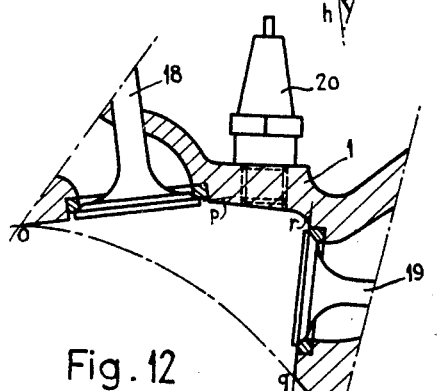

FIG. 8 shows in cross-section along a plane normal to the oblique axis of penetration, an asymmetric combustion chamber, the general shape of which is constituted by two unequally inclined straight lines o–p and q–r, coupled together by a curve of any shape. The valves 18 and 19 are inclined at unequal angles and the sparking plug 20 is displaced with respect to the top.

Figure 9:
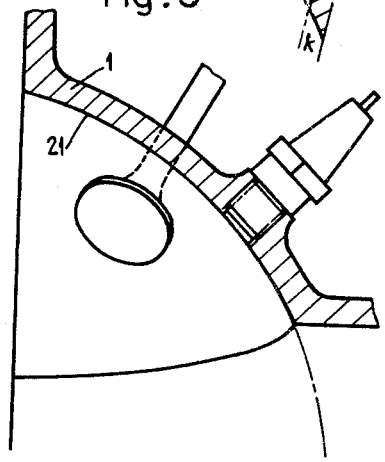
FIG. 9 is a view of a combustion chamber, the generator lines of which are curved instead of being straight as in the forms previously described.

In the embodiment which is shown by FIG. 9 in longitudinal cross-section with respect to the axis of the ring, the generator lines 21 are curved. The transverse sections may be similar to those shown in FIGS. 5 to 8.

FIG. 10 is an alternative form of the relative arrangement of the valves and the sparking plug 22, the latter being mounted on the end-plate 23 of the stator, in the ring 1 of which is formed the combustion chamber 25.

In the case of the chambers according to FIGS. 3 to 9, it is sometimes difficult to place the two valves and the sparking plug on the same arch, especially in the case of engines having a high compression ratio. The arrangement of the sparking plug on the end-plate facing the combustion chamber leaves all the available space for the admission and exhaust valves.

All the combustion chambers, the emplacement and the shapes of which have just been described, can be completely machined by simple machining methods.

Figure 11:
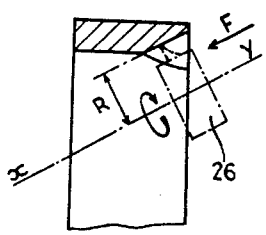
FIG. 11 shows the method of machining the combustion heads of FIGS. 3, 4 and 5.

FIG. 11 shows a method of machining the ring according to the form of construction of the combustion chambers shown in FIGS. 3 to 5. The milling cutter or round tool-bit 26 rotates about the oblique axis x–y and is moved longitudinally in the direction of the arrow F so as to carry out the machining operation following a cylinder of radius R.

Figure 12:
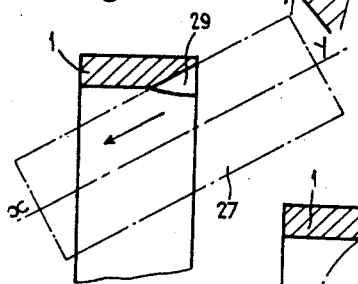
FIG. 12 shows a method of machining by broaching.

FIG. 12 shows a further simple method of machining combustion chambers according to the shapes of FIGS. 3 to 9, this method being adaptable to all complex shapes.

The tool is a broach 27 having its axis inclined at x–y to the axis of the ring 1. The broach is moved longitudinally along this axis so as to machine the profile of the combustion chamber 29.

Figure 13:
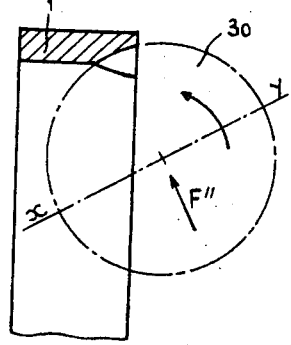
FIG. 13 illustrates the method of machining of combustion chambers in accordance with FIGS. 6, 7 and 8, having curved generator lines.

FIG. 13 is a further method of machining of combustion chambers such as that illustrated in FIG. 9. The tool is a milling cutter 30 having a diameter larger than that employed for the method shown diagrammatically in FIG. 11. It is necessary for the tool-holder to clear the lateral face of the stator.

The milling cutter moves in the direction F″, following a trajectory perpendicular to the axis x–y of penetration of the chamber, so as to machine the combustion chamber with curved generator lines.

The transverse profile in a plane normal to x–y may be of any shape and in particular those of FIGS. 3 to 8.

Figure 14:
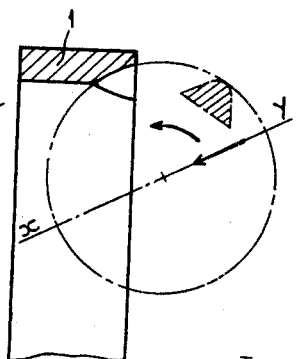
FIG. 14 is similar to FIG. 13, but is intended for the production of straight generator lines.

Finally, FIG. 14 shows a method of machining, using the milling cutter of the previous example, but following this method the cutter is moved along the axis x–y in order to produce straight generator lines.

Figure 15:
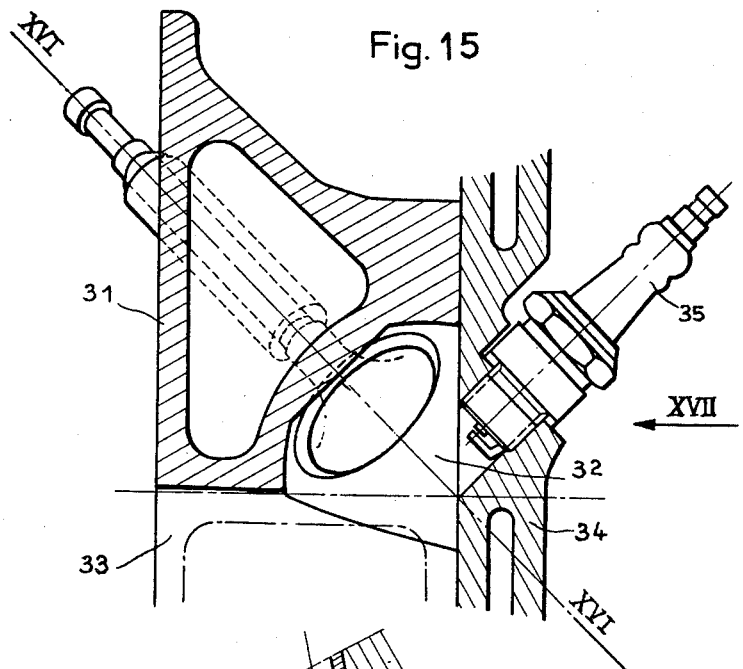
FIG. 15 is a cross-section of the stator through the axis of the chamber, in one particular form of embodiment.
Figure 16:
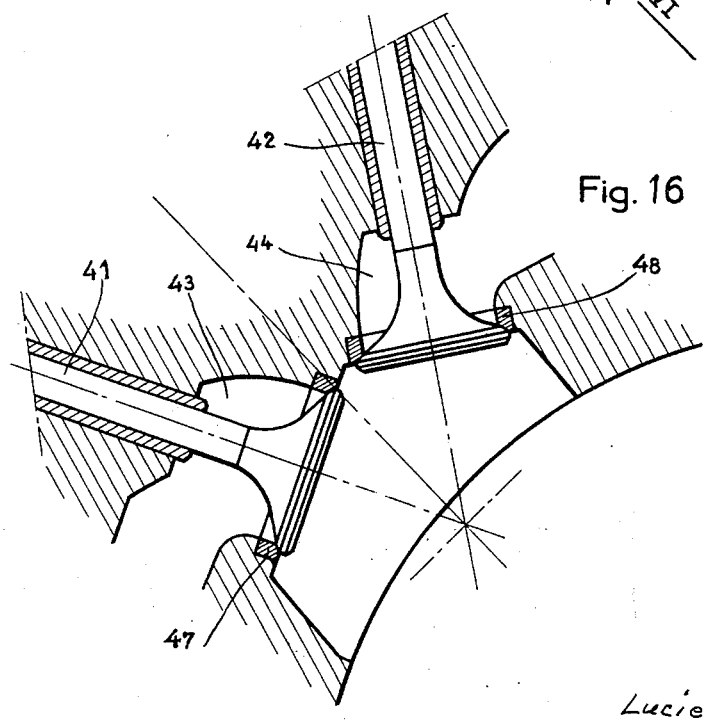
FIG. 16 is a cross-section taken along the plane XVI—XVI of FIG. 15, formed by the axes of the two valves.

Referring to FIG. 15, there can be seen at 31 the ring of the stator in which the combustion chambers 32 are formed in the shape of wedges. The rotor is shown at 33 and at 34 the end-plate closing the combustion chambers 32, the sparking plugs 35 being mounted in this end-plate, substantially in the axis of the chambers. Each chamber 32 is formed by two machinings in the form of truncated cones 37 and 38 (FIG. 17, 18 or 18a) which determine the general shape of a combustion chamber of this kind, these truncated cones forming on the stator an intersection ridge 36, opposite which is located the sparking plug (FIG. 17).

The axes 39 and 40 of these two truncated cones are inclined with respect to the longitudinal axis of the stator so as to permit the penetration of the milling cutters A and B with frusto-conical end profiles, into the stator.

The axes 39 and 40 are convergent and intersect substantially at the height of the inner contour of the stator. The valves 41 and 42 are placed in the line of extension of the axes 39 and 40, and open or close conduits such as 43 and 44, for the admission and discharge of the gases.

FIG. 17 shows clearly the bearing planes 45 and 46 of the valves on their seatings 47 and 48.

FIG. 19 shows the stator 31, the rotor 33, the working chambers 49 and the emplacement of the combustion chambers 32 with respect to the working chambers 49. It can be seen that the axis of symmetry of each chamber 32 can be slightly displaced with respect to the axis of each working chamber, mainly because of the differences in diameter of the valves.

It would of course be possible to envisage other forms of construction of combustion chambers, while remaining within the scope of the invention.

I claim:

1. In a rotary engine, the combination: a stator having a peripheral wall disposed about an axis, the inner surface of said wall being formed with $N+1$ chambers consisting of lobes at a greater distance from said axis than portions of said wall intermediate said lobes, and said stator having first and second ends normal to said axis; a cavity associated with each of said $N+1$ lobes, for forming a combustion chamber, each of said cavities opening onto the same one of said first and second ends and terminating within said outer wall between said first and second ends, each of said cavities being at least partially defined by at least one generatrix revolving about an axis oblique to said stator axis, and first and second wall means for sealing off said first and second ends, thereby forming an enclosed space within said stator, a rotor, mounted for rotation about its own axis as said axis rotates about the stator axis within said stator between said first and second ends, and having N lobes, for cooperating with said $N+1$ chambers, whereby, during rotation of said rotor, said N lobes and said $N+1$ chambers define together $N+1$ working chambers of variable volume, and each of said cavities is sequentially sealed off by a lobe of said rotor; said rotor and stator defining mutually parallel axes.

2. The combination of claim 1, wherein each of said cavities is in the form of two truncated cones, there being two of said axis, said two axes being the respective axes of said two cones and being mutually convergent; and including inlet and exhaust ports and spark plug means associated with each said cavity, said spark plug means being located in that one of said first and second wall means that seals the end onto which the cavities open.

3. The combination of claim 1, wherein said generatrix is that of a cylinder.

4. The combination of claim 1, wherein each of said cavities has two convergent substantially planar sides connected by a curved surface.

5. The combination of claim 1, wherein each of said cavities has two substantially planar side walls connected by a surface which is defined as being generated by said generatrix the said axis of which is located at infinity.

6. The combination of claim 1, wherein each of said cavities is in the form of two truncated cones.

7. The combination of claim 1, including inlet and outlet ports and a spark plug means associated with each said cavity.

References Cited by the Examiner

UNITED STATES PATENTS

| | | | |
|---|---|---|---|
| 1,306,699 | 6/19 | Johanson | 123—8 |
| 1,482,627 | 2/24 | Bullington | 123—11 |
| 1,596,694 | 8/26 | Stafford | 123—16 |
| 2,146,877 | 2/39 | Appleton | 123—16 |
| 2,349,481 | 5/44 | Wallace | 123—14 |

FOREIGN PATENTS

| | | |
|---|---|---|
| 822,397 | 9/37 | France. |
| 1,261,518 | 4/61 | France. |
| 12,517 | 1915 | Great Britain. |

KARL J. ALBRECHT, *Primary Examiner.*

RALPH H. BRAUNER, JOSEPH H. BRANSON, Jr.,
*Examiners.*